Patented Aug. 12, 1930

1,772,965

UNITED STATES PATENT OFFICE

ROWLAND D. SMITH, OF CORNING, NEW YORK, ASSIGNOR TO CORNING GLASS WORKS, OF CORNING, NEW YORK, A CORPORATION OF NEW YORK

FORTIFYING FROSTED-GLASS ARTICLES

No Drawing.    Application filed April 30, 1929.    Serial No. 359,411.

This invention relates to fortifying frosted glass articles and more particularly to fortifying solutions for treating inside frosted articles such as lamp bulbs.

It is well recognized that inside frosted articles are mechanically weak and consequently are apt to be easily broken when subjected to an external blow. It has, therefore, become the general practice to subject such articles to a fortifying process which consists of treating them after frosting with a diluted hydrofluoric acid or a diluted frosting solution. This has the effect of rounding out the sharp angles usually formed between the crystal patterns forming the frosted surface and lessening the possibilities of fracturing the article when it is subjected to mechanical shock.

In commercially frosting and fortifying articles as above outlined, it becomes necessary to repeatedly use the same frosting and fortifying solutions and to add more ingredients as the strength of the solutions diminish. The maintenance of uniform strength of the fortifying solution is usually obtained by adding predetermined amounts of the frosting solution to it and since it is repeatedly used, it eventually becomes super-saturated with reaction products such as silico-fluorides and this results in the precipitation of the reaction products on the glass surfaces which impairs the fortifying process.

The object of the present invention is to improve the fortifying solution by keeping the reaction products in a state of solution and hence preventing their recrystallization on the glass surfaces.

I have found that by adding boric acid to the fortifying solution, recrystallization of the reaction products can be overcome so that proper fortification of the articles can be satisfactorily accomplished on an economical basis.

In carrying my invention into practice, I add to a fortifying solution containing hydrofluoric acid and ammonium bifluoride, a small amount of boric acid. I have found that by the addition of boric acid, the cutting action of the solution is somewhat decreased, but by maintaining the boric acid content relatively low, the speed of the process is not materially affected and yet the difficulties usually encountered, due to the precipitation of the reaction products, can be overcome.

The quantities of hydrofluoric acid in the solution may vary between five (5%) and twenty (20%) percent, the ammonium bifluoride may vary between ten (10%) and twenty-five (25%) percent, while the boric acid may vary from two (2%) to ten (10%) percent according to the formula used in mixing the fortifying batch and to the composition of the glass to be treated.

I have found that a fortifying solution containing about fifteen (15%) percent hydrofluoric acid, about twelve (12%) percent ammonium bifluoride and about two (2%) percent boric acid will satisfactorily fortify a frosted glass bulb whose composition contains about seventy-two (72%) percent silica, seventeen (17%) percent sodium oxide and about eight (8%) or nine (9%) percent lime, and that such a solution may be used repeatedly, as in commercial operations, and yet produce satisfactory fortification of the articles.

I claim:

1. A fortifying solution, for use in connection with the frosting of glass articles, which contains boric acid.

2. A fortifying solution, for use in connection with the frosting of glass articles, which contains not over 10% boric acid.

3. A fortifying solution, for use in connection with the frosting of glass articles, which contains not over 25% ammonium bifluoride, not over 10% boric acid and at least 5% of hydrofluoric acid.

4. The method of strengthening frosted articles which consists in treating their frosted surfaces with a fortifying solution containing boric acid.

ROWLAND D. SMITH.